United States Patent
Wu et al.

(10) Patent No.: US 6,799,039 B2
(45) Date of Patent: Sep. 28, 2004

(54) NETWORK RESOURCE SHARING DURING HANDOVER OF A MOBILE STATION BETWEEN CELLULAR WIRELESS NETWORKS

(75) Inventors: Geng Wu, Plano, TX (US); Mo-Han Fong, L'Orignal (CA)

(73) Assignee: Nortel Networks Limited, St. Laurent (CA)

(*) Notice: Subject to any disclaimer, the term of this patent is extended or adjusted under 35 U.S.C. 154(b) by 467 days.

(21) Appl. No.: 09/835,035

(22) Filed: Apr. 13, 2001

(65) Prior Publication Data
US 2001/0036830 A1 Nov. 1, 2001

Related U.S. Application Data

(60) Provisional application No. 60/197,554, filed on Apr. 17, 2000.

(51) Int. Cl.$^7$ ................................................ H04Q 7/20
(52) U.S. Cl. ................ 455/436; 455/437; 455/440; 455/442; 370/331
(58) Field of Search ................................ 455/436, 440, 455/437, 439, 438, 442, 428, 445, 443, 560, 561, 552.1, 555, 556.1, 554.5–2; 370/331, 338

(56) References Cited

U.S. PATENT DOCUMENTS

| | | | | |
|---|---|---|---|---|
| 5,737,703 A | * | 4/1998 | Byrne | 455/442 |
| 6,115,754 A | * | 9/2000 | Landgren | 455/442 |
| 6,230,013 B1 | * | 5/2001 | Wallentin et al. | 455/436 |
| 6,272,148 B1 | * | 8/2001 | Takagi et al. | 370/469 |
| 6,295,452 B1 | * | 9/2001 | Choi | 455/436 |
| 6,301,479 B1 | * | 10/2001 | Roobol et al. | 455/436 |
| 6,385,451 B1 | * | 5/2002 | Kalliokulju et al. | 455/437 |
| 6,473,411 B1 | * | 10/2002 | Kumaki et al. | 455/436 |
| 6,522,641 B1 | * | 2/2003 | Siu et al. | 455/436 |
| 6,522,880 B1 | * | 2/2003 | Verma et al. | 455/436 |
| 6,553,015 B1 | * | 4/2003 | Sato | 370/331 |
| 6,574,473 B2 | * | 6/2003 | Rinne et al. | 455/436 |
| 6,590,879 B1 | * | 7/2003 | Huang et al. | 455/436 |
| 6,590,885 B1 | * | 7/2003 | Jorgensen | 370/338 |
| 6,611,547 B1 | * | 8/2003 | Rauhala | 370/331 |
| 6,690,659 B1 | * | 2/2004 | Ahmed et al. | 370/328 |

\* cited by examiner

Primary Examiner—William Trost
Assistant Examiner—Joseph Nguyen
(74) Attorney, Agent, or Firm—Bruce Garlick

(57) ABSTRACT

System components of cellular wireless networks are shared during and after a mobile station handover from a first cellular wireless network (system A) to a second cellular wireless network (system B). According to one aspect, layer 2/3 call control functions are anchored in a base station controller (BSC) of system A, even after a data communication is handed over from system A to system B. According to another aspect, a link layer supporting the data communication is anchored in the BSC of system A servicing the data communication. In this case, the BSC of system A interfaces with a serving BTS of system B to service the ongoing data communication. According to still another aspect, the link layer is handed over to system B but the link layer of system B continues to use a link layer transmit buffer of system A that remains in the servicing BSC of system A.

21 Claims, 12 Drawing Sheets

NETWORK RESOURCE SHARING DURING HANDOVER OF A MOBILE STATION BETWEEN CELLULAR WIRELESS NETWORKS

CROSS-REFERENCE TO RELATED APPLICATION

The present application claims priority pursuant to 35 U.S.C. Sec 119(e) to U.S. Provisional Application Serial No. 60/197,554, filed Apr. 17, 2000, which is hereby incorporated by reference in its entirety.

BACKGROUND

1. Technical Field

The present invention relates generally to cellular wireless communication networks; and more particularly to the servicing of high data rate packetized data communications within such cellular wireless communication networks.

2. Related Art

Wireless networks are well known. Cellular wireless networks support wireless communication services in many populated areas of the world. While cellular wireless networks were initially constructed to service circuit-switched voice communications, they are now called upon to support packet-switched data communications as well.

The transmission of packetized data communications within a wireless network places different demands on networks than does the transmission of voice communications. Voice communications require a sustained bandwidth with minimum signal-to-noise ratio (SNR) and continuity requirements. Data communications, on the other hand, typically are latency tolerant but have higher total throughput requirements. Conventional circuit-switched wireless networks were designed to support the well-known voice communication requirements. Thus, wireless networks (as well as conventional circuit switched telephone networks) have been adapted to service data communications, with such adaptation providing mixed results. Thus, future wired and wireless networks will likely be fully packet switched.

Because packet data transmissions typically employ a greater bandwidth on the forward link than they do on the reverse link, various standards have been promulgated which focus on high data rate forward link transmissions. These standards include, for example, the high speed downlink packet access (HSDPA) standard. The HSDPA is a backward compatible standard that is compatible with the UMTS standard, which is widely used in Europe. The 1x EV-DO and 1x EV-DV standards will also provide high data rate forward link transmissions. 1x EV-DV will be backward compatible with the 1x RTT standard, which is a member of cdma2000 family of standards. Note that the HSDPA and 1x EV standards typically employ a semi-distributed network architecture.

With the standardization of wireless communications to support high data rate data, various types of high data rate data transmissions will now be possible, e.g., streaming video, streaming audio, and other high data rate transmissions in addition to facilitating packet data transmissions at high data rates. However, during transitory portions of call servicing, the high data rate transmission will be interrupted, and in some cases terminated. For example, when a mobile station that is being serviced by a first base station is handed over to a second base station, provisions must be taken to ensure that little or no lost data or delay in transmission results.

Further, when a mobile station is handed over from a first wireless network to a second wireless network, no data loss, and little interruption in data delivery should occur. However, continued servicing of a data communication during handover with little delay and with no lost data is an extremely difficult task. These difficulties are partially caused because data transmission paths are altered during the handover and because the participating systems oftentimes support different operations, e.g., different physical layers.

Thus, there is a need in the art for a cellular wireless network a methodology for supporting high data rate forward link transmissions when a mobile station is handed over from a first cellular wireless network to a second cellular wireless network.

SUMMARY OF THE INVENTION

In order to overcome these shortcomings, among others, the present invention includes structure and operations for minimizing data loss and minimizing delay in data delivery when a mobile station is handed over from a first cellular wireless network (system A) to a second wireless network (system B). Such benefits are accomplished by system A and system B sharing resources during and after the mobile station is handed over from system A to system B.

According to the present invention, both system A and system B support high data rate forward link transmissions to the mobile station. The data communication being serviced before, during, and after system handover is a high data rate data communication, e.g., a data communication established between a data streaming or voice over IP server coupled to the Internet and the mobile station. With the structures and methods of the present invention employed, system A and system B operate in cooperation with one another to provide a substantially seamless handover operation.

When the data communication is initially setup by system A, system A provisions and enables resources to receive data from the Internet intended for the mobile station and to pass the data to the mobile station via a combination of wired and wireless links. In one embodiment, system A services this data communication via a path that includes a Packet Data Serving Node (PDSN) that couples to the Internet, a Base Station Controller (BSC) that couples to the PDSN, and a base station that couples to the BSC and that includes a Base station Transceiving Subsystem (BTS) that services the wireless link to the mobile station. In the embodiment, the PDSN supports IP/PPP protocol layers (layers 4,3), the BSC supports a portion of the Link Layer (D-RLP, layer 2), and the BTS supports a portion of the Link Layer (C-RLP), a MAC layer, and a physical layer. The BSC of system A also performs all layer 2/3 call control functions for the data communication. Further, the link layer serviced by the BSC includes an RLP transmit buffer. System B may include the same, or similar structure.

According to prior art operations, during a system A to system B handover, all components of system A service the data communication until the handover is complete and then are no longer employed to service the data communication. In this prior art operation, therefore, system B would perform all functions previously performed by system A after the handover is completed. During this prior art handover, all transmit data buffer contents are lost during the handover. Because this data delay/loss occurs, data recovery operations are initiated. Not only do these prior art operations disrupt the data and interactive multimedia communication such as VoIP but also, because of the delay introduced, higher level protocols supporting the data communication may terminate the data communication by assuming that the supporting communication links had failed.

Thus, according to the present invention, system A and system B interact to share resources, with such resource sharing reducing delay or disruption in the data communication. According to one aspect of the present invention, layer 2/3 call control functions are anchored in the BSC of system A, even after the data communication, and all data paths associated therewith are handed over from system A to system B. According to another aspect of the present invention, the RLP layer (layer 2) supporting the data communication is anchored in the BSC of system A servicing the data communication. In this case, the BSC of system A interfaces with a serving BTS of system B to service the ongoing data communication. According to still another aspect of the present invention, the RLP layer (layer 2) is handed over to system B but the RLP layer of system B continues to use the RLP transmit buffer of system A that remains in the servicing BSC of system A.

The present invention may be embodied in operations performed by various components of a cellular wireless network. Further, the present invention may be embodied in these various components themselves. Finally, the present invention may be embodied in a plurality of software instructions executed by various components of the cellular wireless network. These, and other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
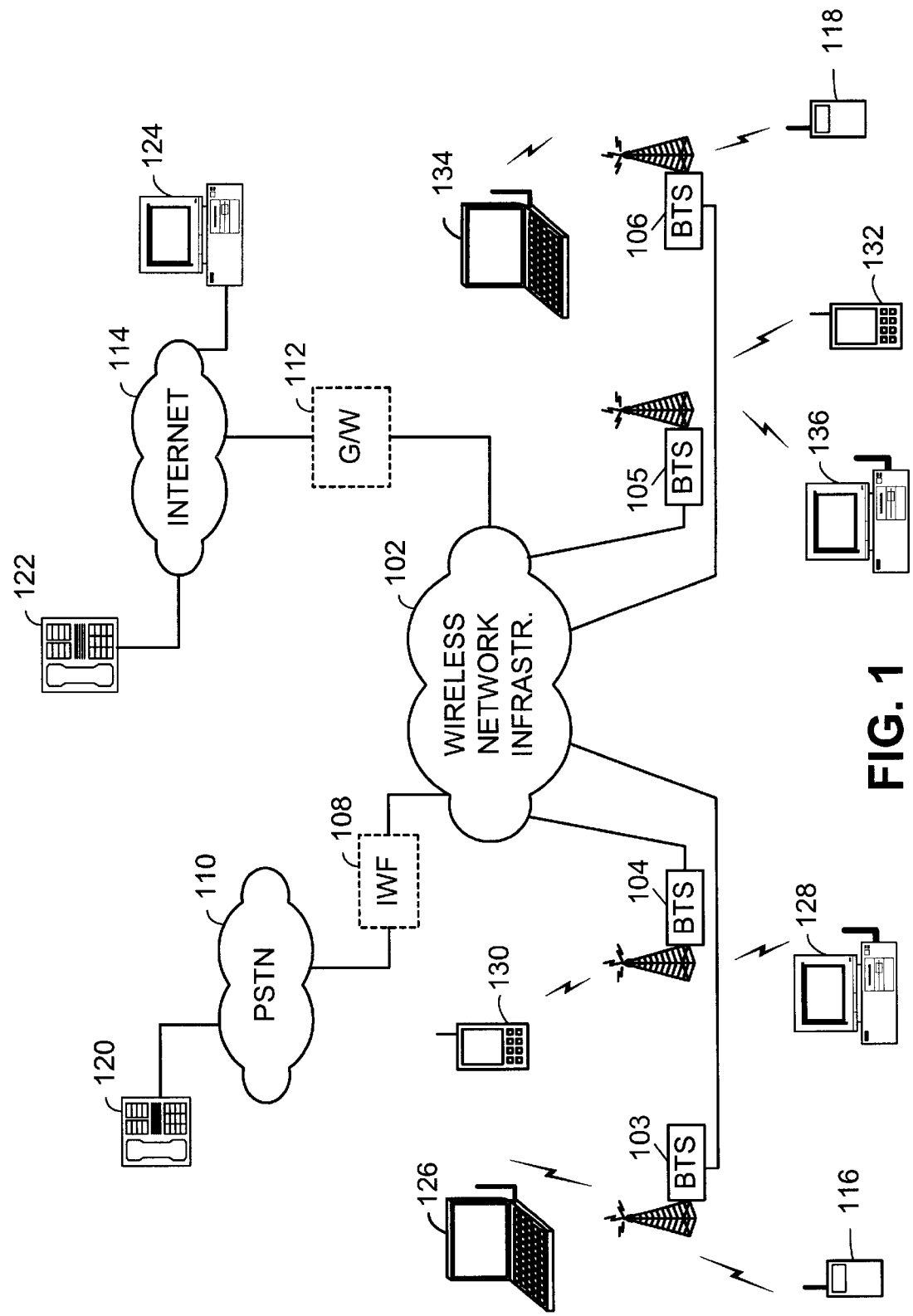
FIG. 1 is a system diagram illustrating a portion of a cellular wireless network constructed according to the present invention.

FIG. 1 is a system diagram illustrating a portion of a cellular wireless network constructed according to the present invention. The cellular wireless network includes a wireless network infrastructure 102 and base stations 103, 104, 105, and 106. The wireless network infrastructure 102 couples to the Internet 114. The wireless network infrastructure 102 also couples to the Public Switched Telephone Network (PSTN) 110. In one embodiment of the present invention, the network infrastructure 102 is circuit switched, couples directly to the PSTN 110, and couples to the Internet 114 via a gateway (G/W) 112. In another embodiment of the present invention, the network infrastructure is packet switched, couples directly to the Internet 114, and couples to the PSTN via an interworking function (IWF) 108.

A conventional voice terminal 120 couples to the PSTN 110. A VoIP terminal 122 and a server computer 124 couple to the Internet 114. Mobile stations 116, 118, 126, 128, 130, 132, 134, and 136 wirelessly couple to the wireless network via wireless links with the base stations 103–106. As illustrated, mobile stations may include cellular telephones 116 and 118, laptop computers 126 and 134, desktop computers 128 and 136, and data terminals 130 and 132. However, the wireless network supports communications with other types of mobile stations as well.

Each of the base stations 103–106 services a cell/set of sectors within which it supports wireless communications. Wireless links that include both forward link components and reverse link components support wireless communications between the base stations and their serviced mobile stations. These wireless links support both data communications and multimedia communications such as VoIP. The teachings of the present invention may be applied equally to any type of packetized communication.

However, data communications having a high data rate forward link requirement are particularly benefited by the present invention. An example of such a communication occurs when a streaming data communication is setup between server computer 124 and mobile station 132, for example. In such case, the cellular wireless network must support these high data rate transmissions to the mobile station 132, even while the mobile station 132 roams from base station to base station of base stations 103–106.

The cellular system operates according to a high data rate standard such as the HSDPA standard, the 1x EV-DO standard, the 1x EV-DV standard, or the high data rate standard that is modified or otherwise operates according to the present invention. According to these operating standards, each of the base stations supports a high data rate forward channel (F-CH). In some embodiments, the F-CH is a spread-spectrum time multiplexed channel that services only a single mobile station at any given time. To increase channel throughput, the forward link transmissions of the F-CH may be modulated with a set of Walsh codes prior to its transmission to increase diversity.

As described, any of the base stations 103–106 may serve the high data rate forward link to a mobile station, (e.g., mobile station 132). However, the data path within the wireless network infrastructure 102 will be altered when the mobile station 132 receives high data rate forward link transmissions from differing base stations of the active set of base stations. For example, when a communication is set-up that is initially serviced by base station 105, data is buffered at base station 105 and then transmitted to the mobile station 132. A first data path will be setup within the wireless network infrastructure to service the data communication for this operation.

However, when the mobile station receives forward link data from another base station, e.g., base station 106, the forward link data is then transmitted from the new serving base station 106. Thus, the forward link data path is altered within the wireless network infrastructure to service the data communication via base station 106. Each time that the mobile station is serviced by a differing base station of its active set of base stations, the forward link path within the wireless network infrastructure 102 will be altered.

Figure 2:
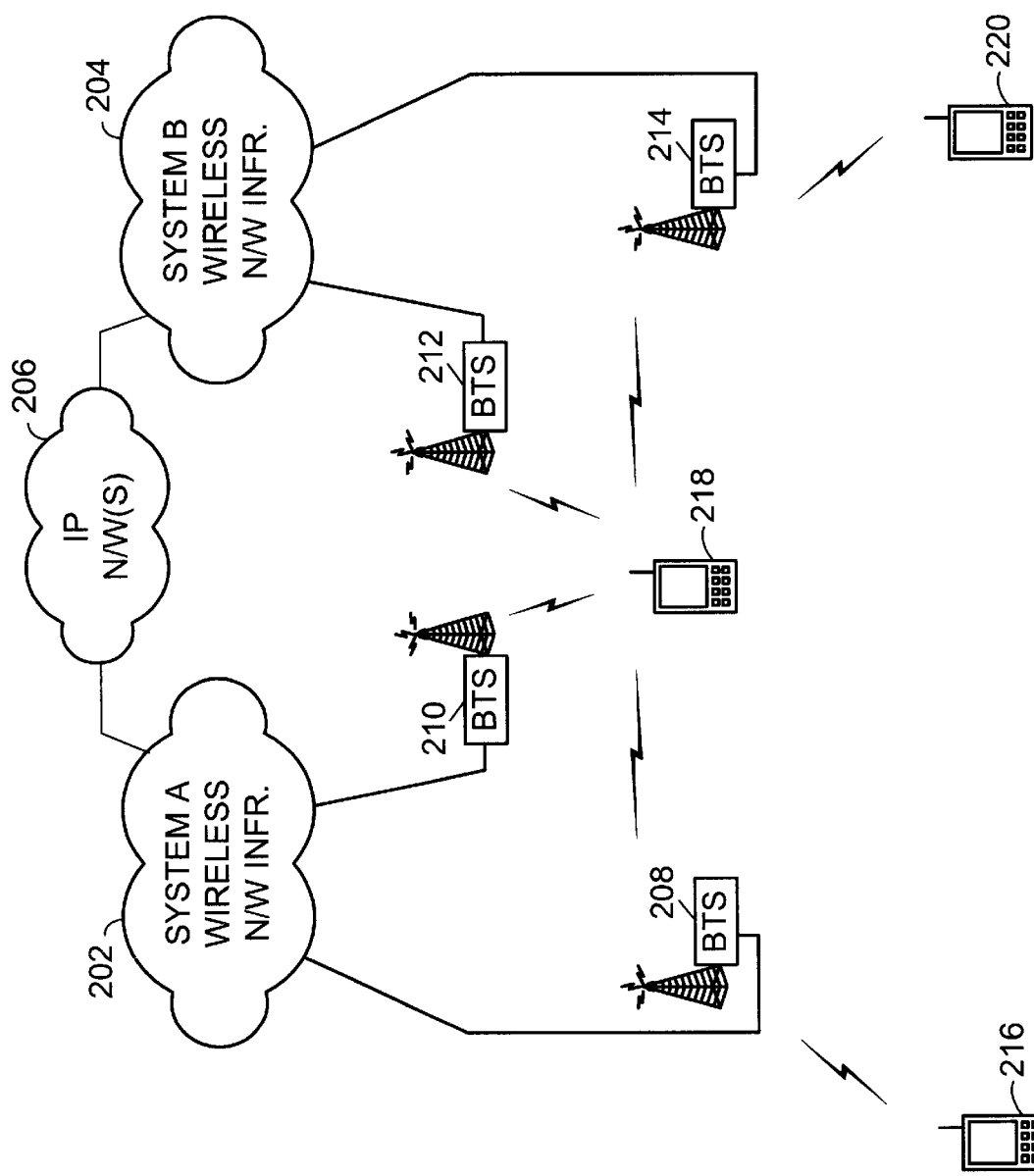
FIG. 2 is a system diagram illustrating a first cellular wireless network and a second cellular wireless network that jointly service high data rate forward link transmissions to a mobile station.

FIG. 2 is a system diagram illustrating a first cellular wireless network (system A) and a second cellular wireless network (system B) that jointly service high data rate forward link transmissions for a mobile station. In particular, system A includes a wireless network infrastructure 202 and system B includes a wireless network infrastructure 204, both coupling to at least one packet data network 206, e.g., a combination of the Internet and other networks.

Portions of each of system A and system B are illustrated to describe the operations of the present invention. Each of these systems will also include a great number of wireless network components that are not specifically shown in FIG. 2. In FIG. 2, system A includes two base stations that include BTSs 208 and 210, towers, and antennas. The BTSs 208 and 210 couple to the system A wireless network infrastructure 202. When a mobile station is operating at position 216, BTSs 208 and 210 are in the active set of the mobile station and service all wireless communications for the mobile station. Therefore, with the mobile station at position 216, either BTS 208 or BTS 210 may transmit high data rate forward link transmissions to the mobile station.

However, as the mobile station moves from position 216 to position 218, it begins to receive forward link transmissions from BTS 212 and/or BTS 214 that are coupled to the system B wireless network infrastructure 204. The mobile station at position 218 makes a request to be serviced by BTS 212 and/or BTS 214 based upon the quality of pilot signals, (e.g., C/I ratio) transmitted by BTS 212 and 214 and received by the mobile station.

As the mobile station moves from position 218 to position 220, a system handover from system A to system B occurs. The system handover, as is generally known, is a set of operations that occur when a mobile station moves from being serviced by a first system, system A, to being serviced by a second system, system B. While the mobile station resides at position 218 it first receives forward link transmissions from system A then receives forward link transmissions from system B. However, when the mobile station moves to, and resides at position 220, it receives forward link transmissions only from system B.

Because the data communication was originally serviced by system A, the data communication was fully serviced by system A. These services provided by system A may be broadly classified as call control functions and data path functions. According to the present invention, the call control functions provided by system A may continue to be provided by system A after the mobile station has been handed over to system B. Alternately, the call control functions may be handed over to system B as the mobile station is handed over to system B.

Further, the data path functions provided by system A when it services the mobile station at position 216 and 218 may be fully or partially handed over to system B when the mobile station is handed over to system B. By handing over a portion of the call control functions and/or the data functions to the new serving system while retaining a portion of the call control functions and/or data functions by the old serving system, data integrity is increased, data loss is reduced, and data latency is reduced.

Figure 3A:
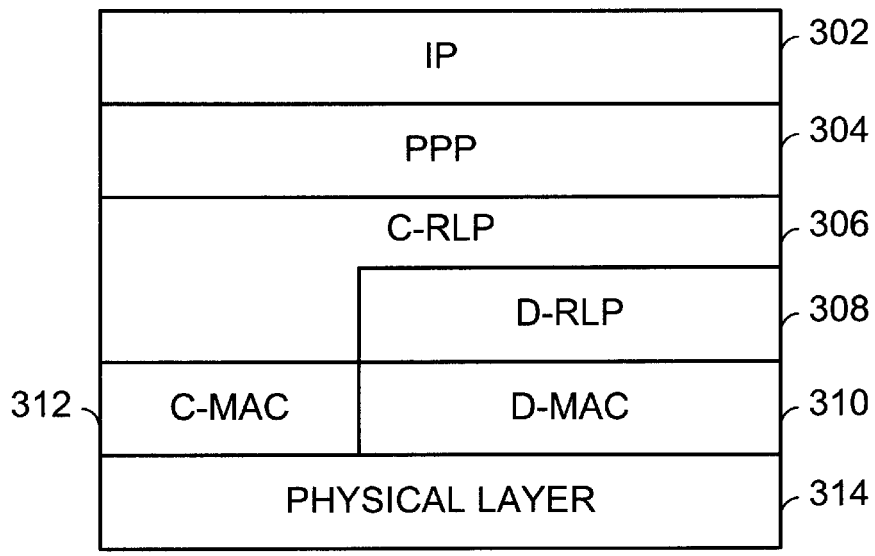
FIG. 3A is a block diagram illustrating a typical wireless data communication protocol stack supported according to the present invention.

FIG. 3A is a block diagram illustrating a typical wireless data communication stack supported according to the present invention. This protocol stack includes an Internet Protocol (IP) layer 302, a Point-to-Point Protocol (PPP) layer 304, and additional layers residing below the PPP 304 layer. Immediately below the PPP layer 304, is a Radio Link Protocol (RLP) layer. The RLP layer includes a centralized RLP component (C-RLP) 306 and a distributed RLP component (D-RLP) 308 according to the illustrated embodiment. In the embodiment, the distributed RLP structure is employed to service transmissions on the high data rate forward link.

Residing below the RLP layer is a Media Access Control (MAC) layer. The MAC layer includes a centralized MAC component (C-MAC) 312 and a distributed MAC component (D-MAC) 310. Residing below the MAC layer is the physical layer 314. The components of the ISO protocol stack supported according to the present invention illustrated in FIG. 3A are generally known. Thus, these components will not be described other than to expand upon the principles of the present invention.

Figure 3B:
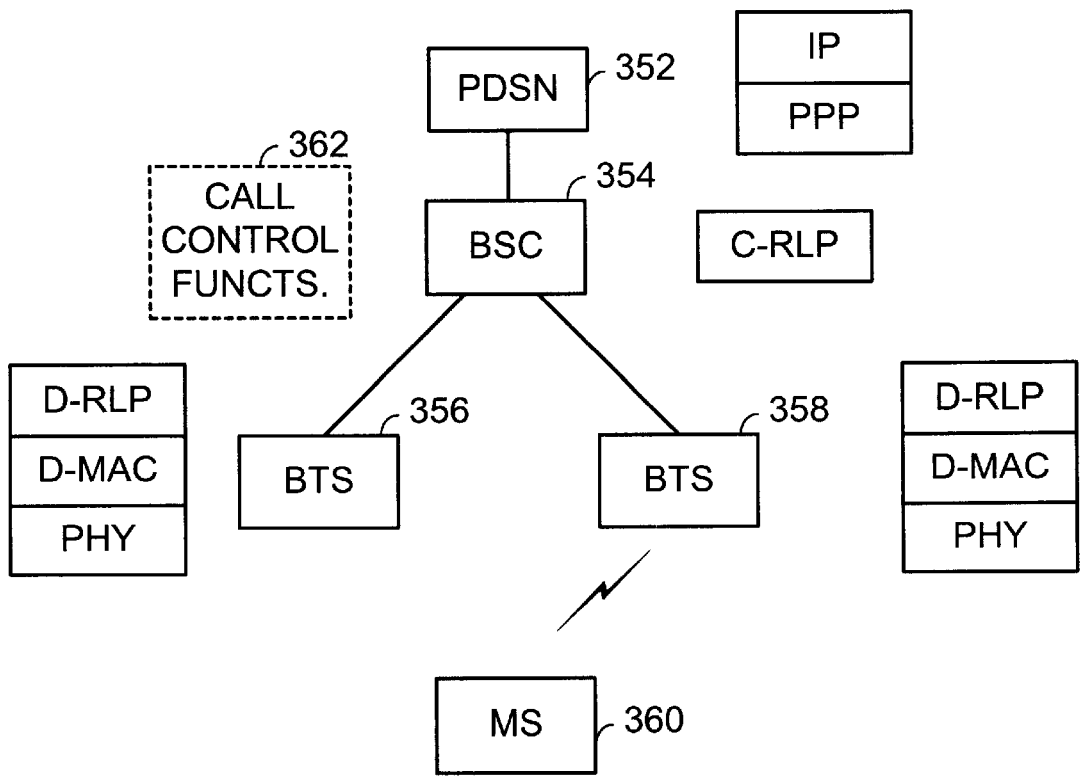
FIG. 3B is a block diagram illustrating portions of the cellular wireless network and the manner in which the components of a typical wireless communication protocol stack are serviced according to the present invention.

FIG. 3B is a block diagram illustrating portions of the cellular wireless network and the manner in which the components of a typical cellular wireless communication protocol stack are serviced according to the present invention. As shown in FIG. 3B, some of the protocol components shown in FIG. 3A are distributed among a plurality of cellular wireless network components. A packet data serving node (PDSN) 352 supports the IP 302 and PPP 304 layers. A base station controller (BSC) 354 supports the C-RLP 306 component of the RLP layer. Base station Transceiving Subsystems (BTS) 356 and 358, each associated with a respective base station, support the D-RLP 308 component of the RLP layer, the D-MAC 310 component of the MAC layer, and the physical layer 314.

The term "base station" was used with reference to FIGS. 1 and 2. Each base station includes a BTS, a tower, and an antenna. The BTS includes the electronic components of the base station. Thus, in some subsequent description, the term BTS is used in conjunction with the description of some operations, protocol layers, etc. The reader should understand that each BTS corresponds to a particular base station and the description herein should be read with this in mind.

The BSC 354 provides layer 2/3 call control functions 362 for the serviced data communication. These call control functions 362 include the operations required to service a corresponding data communication, etc., call setup, call monitoring, call termination, etc. According to the present invention after a handover has been completed, these call control functions 362 may be retained by a servicing BSC of system A, even though the servicing BSC does not service a corresponding link layer (C-RLP). By retaining these call control functions, the data communication may be better serviced. Of course, in some operations, handing over the layer 2/3 call control functions may result in better performance. Factors that affect performance include processing requirements of each system, the relative ease with which each system supports the layer 2/3 call control functions, among other factors.

The distributed architecture described with reference to FIGS. 3A and 3B are simply one protocol suite that may be employed in conjunction with the present invention. Other known protocol suites that have been modified according to the present invention may be employed as well. For example, a non-distributed RLP layer and non-distributed MAC layer may be implemented on the appropriate network elements.

Figure 4:
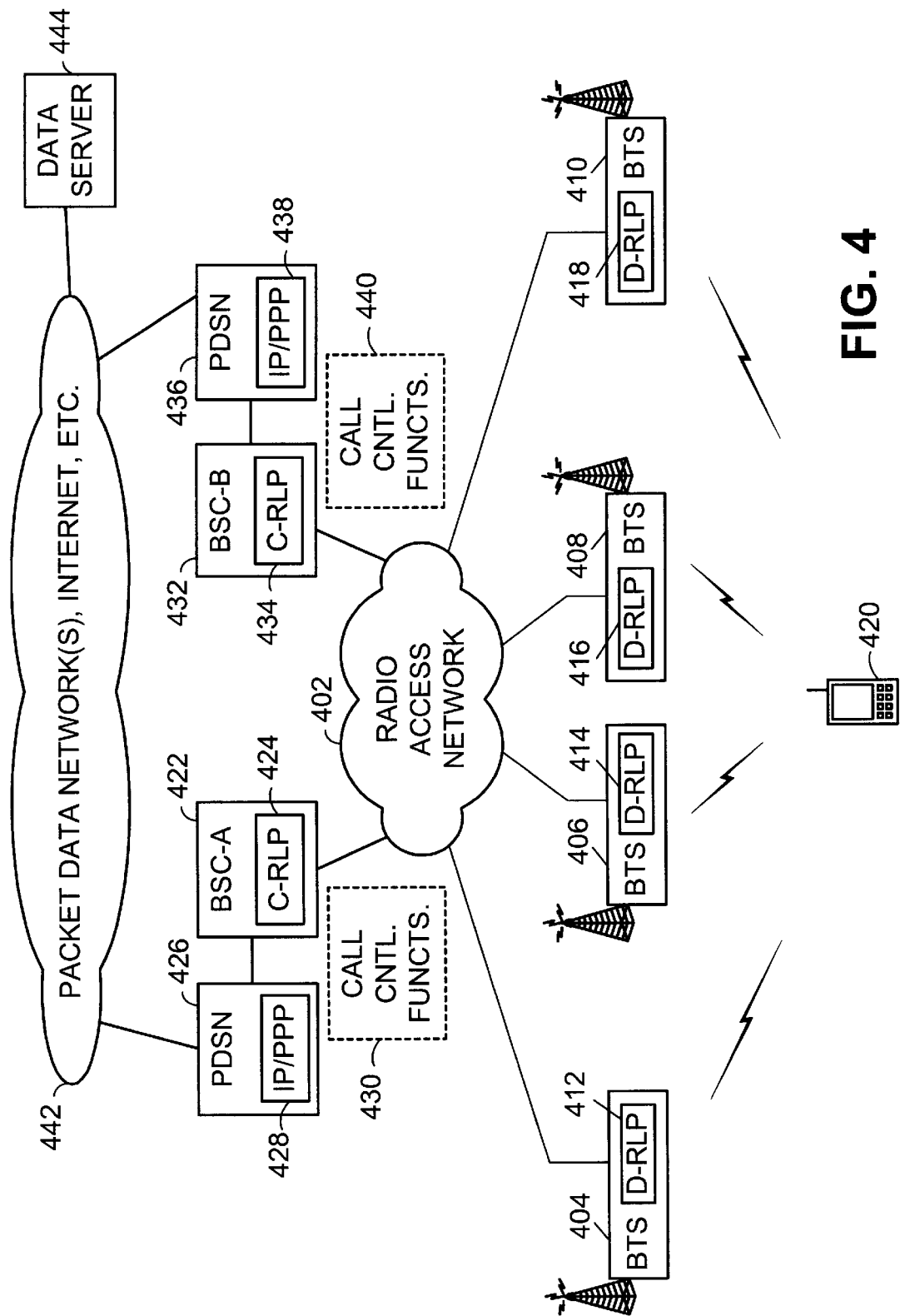
FIG. 4 is a system diagram illustrating in more detail the cellular wireless networks of FIG. 2.

FIG. 4 is a system diagram illustrating in more detail the cellular wireless networks of FIG. 2. System A includes a BSC 422 and a PDSN 427. BSC 422 services C-RLP layer, which includes a C-RLP transmit buffer. The PDSN 426 services IP/PPP layers 428. The BSC 422 couples to a radio access network 402 and provides a path for forward link data transmissions to the mobile station 420 that are received from a packet data network by the PDSN 427 and passed to the BSC 422. The BSC 422 also provides layer 2/3 call control functions 430. These call control functions control the setup and servicing of a data communication to the mobile station 420. System A also includes BTSs 404 and 406 that service Likewise, system B includes a BSC 432 and a PDSN 437 that service a data communication path between the. BSC 432 services C-RLP layer 434 and includes an RLP transmit buffer while PDSN 436 services IP/PPP layer 438. The BSC 432 also couples to the radio access network 402 and also provides a path for forward link data transmissions to the mobile station 420. The BSC 432 provides layer 2/3 call control functions 440.

As is shown, a radio access network 402 may be accessed by both system A and system B. While the radio access network 402 is shown as a single network in FIG. 4, system A and system B will each included their respective radio access networks with an intercoupling element, e.g., router, gateway, etc., coupling the radio access networks. Thus the system A and system B radio access networks will, in effect, form the single radio access network 402 via appropriate switching/routing operations.

The radio access network 402 couples to four base stations. A first base station includes BTS 402 and a D-RLP layer 412. A second base station includes BTS 406 and a D-RLP layer 414. The first and second base stations form a portion of system A. Base stations including BTSs 408 and 410 form a portion of system B and 410 include D-RLP layers 416 and 418, respectively.

In the example of FIG. 4, a data server 444 couples to a packet data network 442 and transmits packet data transmissions to mobile station 420 in a data communication. In such case, the data server 444 transmits the packet data via the packet data network 442 to the PDSN 426. The PDSN 426 then forwards the packet data to BSC 422, the radio access network 402, and to one of, or both of BTSs 404 and 406. One of the BTSs 404 or 406 then transmits the data over a respective wireless link to mobile station 420.

In this data communication, a complete protocol stack, such as the protocol stack illustrated in FIGS. 3A and 3A are supported by system A. In particular, the PDSN 426 supports the IP/PPP protocol layers 428. The IP/PPP protocol layer 428 includes an IP/PPP transmit buffer. Further, the BSC 422 supports a C-RLP layer 424. The C-RLP layer 424 includes a C-RLP transmit buffer. BTSs 404 and 406 support the D-RLP, D-MAC, and PHY protocol layers. In servicing the D-RLP layer, the BTSs 404 and 406 include D-RLP layers 412 and 414, respectively. These protocol layers operate to service the data transmissions from the data server 444 to the mobile station 420.

System B also supports all protocol layer components that may be employed to service the data communication for the mobile station 420. For example, BTSs 408 and 410 support D-RLP layers 416 and 418, respectively. These D-RLP layers 416 and 418 include D-RLP transmit buffers. Further, system B includes BSC 432 and PDSN 436 that provide a data path between the packet data network 442 and the radio access network 402. The BSC 432 supports call control functions 440 for system B. In system B, the BSC 432 supports a C-RLP layer 434 that includes a C-RLP transmit buffer. Further, the PDSN 436 supports IP/PPP layers 438 which include IP/PPP transmit buffers.

During a system A to system B handover, mobile station 420 first receives forward link transmissions from BTS 404 and/or BTS 406 of system A and then receives forward link transmissions from BTS 408 and/or BTS 410 of system B. In one particular example of such a system handover, mobile station 420, while receiving forward link transmissions from BTS 406, interacts with system A to indicate that BTS 408 would provide better forward link transmissions. System A interacts with system B to request an allocation of resources in system B. Once these resources are allocated and setup, BTS 408 of system B begins transmitting on a forward link to the mobile station. The mobile station 420 is then handed over from system A to system B and ceases receiving forward link transmissions from the BTSs 404 and 406 of system A.

According to one aspect of the present invention, call control functions 430 that were employed to setup and service the data communication remain with system A even after the data communication is handed over to system B. According to another aspect of the present invention, the call control functions are handed over to system B and system B establishes call control functions (as call control functions 440) to continue servicing the data communication after handover. These call control functions may be anchored in system A or handed over to system B, independent of whether data path functions are altered.

According to another aspect of the present invention, the IP/PPP layer 428 and the C-RLP layer 424 transmit buffers of system A continue to service the data communication for the mobile station 420 after it has been handed over from system A to system B.

According to still another aspect of the present invention, the IP/PPP layer 428 in PDSN 426 of system A continues to service the data communication while the C-RLP layer 434 transmit buffer in BSC 432 of system B is employed to service the data communication once the call is handed over to system B.

Figure 5:
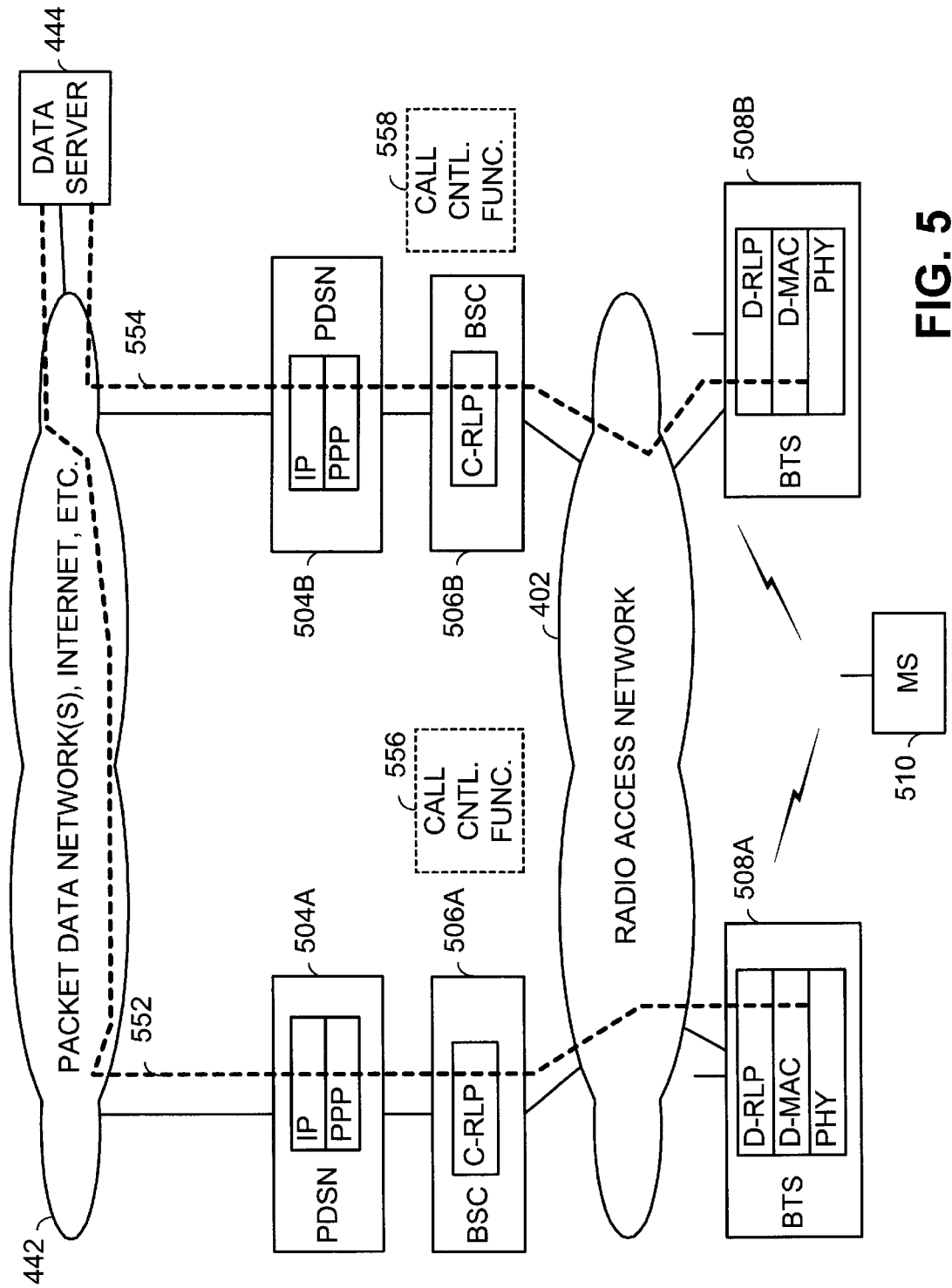
FIG. 5 is a system diagram illustrating the cellular wireless networks of FIG. 2 according to a first operation of the present invention.

FIG. 5 is a system diagram illustrating first and second cellular wireless networks that operate according to a first operation of the present invention. In particular, FIG. 5 shows a packet data network 442 coupled to a data server 444. The data server services a forward link data communication to mobile station 510. System A includes a PDSN 504A and BCS 506B that couple to radio access network 402. System B includes a PDSN 504B and a BCS 504B that also couple to radio access network 402. As is shown, each of the PDSNs 504A and 504B support IP and PPP protocol layers. Such protocol layers include IP/PPP transmit data buffers that buffer data received from the data server 444.

Each of the BSCs 506A and 506B service a corresponding C-RLP protocol layer, which include respective C-RLP transmit buffers.

Also coupled to radio access network are BTS 508A of system A and BTS 508B of system B. While being serviced by system A, mobile station 510 receives forward link transmissions from BTS 508A. As is shown, BTS 508A supports a D-RLP layer, a D-MAC layer and a physical protocol layer. After being handed over to system B, mobile station receives forward link transmissions from BTS 508B.

With the data communication first serviced by system A, a data path 552 is setup between data server 444 and mobile station 510. This data path 552 traverses the packet data network 442, PDSN 504A, BSC 506A, radio access network 402, and BTS 508A. As was previously described, any of the base stations in the mobile stations active set may service the forward link transmissions to the mobile station 510. While system A services the data communication, BSC 506A of system A provides layer 2/3 call control functions 556 for the data communication.

According to a first aspect of the present invention, after a handover to system B from system A, system A no longer services any of the data path for the data communication but continues to service layer 2/3 call control functions 556. In such an operation, data path 554 services the data communication after the handover. As is shown, data path 554 is serviced by PDSN 504B, BSC 504B, radio access network 402, and BTS 508B, each of these components being part of system B. In this case, none of the system A components that previously serviced the data path for the data communication provide any function in the new data path 554. However, system A provides layer 2/3 call control functions in continuing to service the data communication. This operation may be contrasted to a prior art operation in which system B would take over and provide layer 2/3 call control operations 558 as well as servicing the new data path 554.

Figure 6:
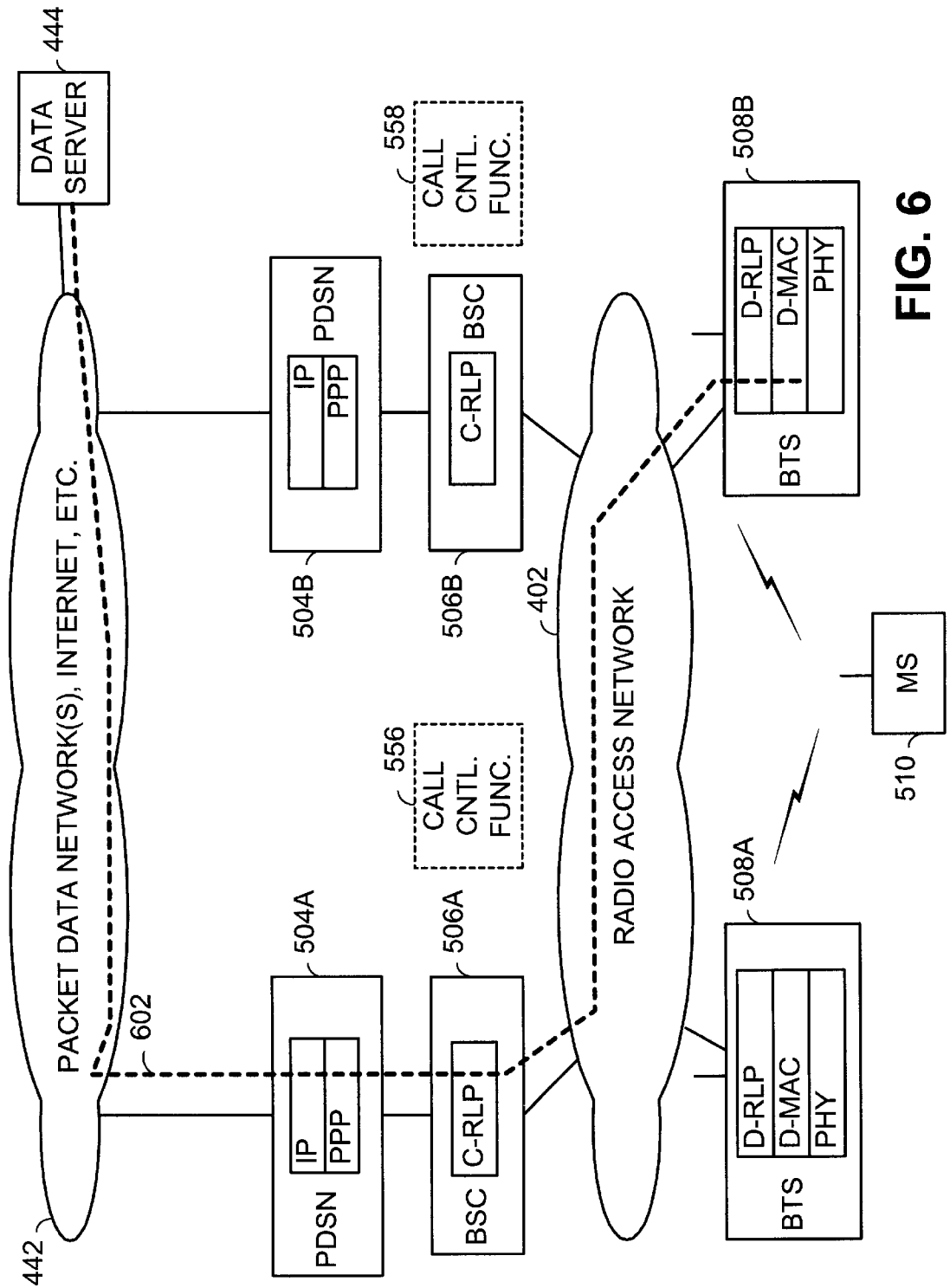
FIG. 6 is a system diagram illustrating the cellular wireless networks of FIG. 2 according to a second operation of the present invention.

FIG. 6 is a system diagram illustrating first and second cellular wireless networks that operate according to a second operation of the present invention. FIG. 6 includes the same components. In the handover of FIG. 6, layer 2/3 call control functions may still be provided by system A (call control functions 556), or alternatively the layer 2/3 call control functions they may have been handed over to system B (call control functions 558). According to the present invention, a data path 602 has been altered such that a portion of the data path 602 is serviced by system A and a portion of the data path is serviced by system B.

In the data path 602 of FIG. 6, the PDSN 504A and the BSC 506A continue to service the data communication for mobile station 510 but include the BTS 508B of system B that is access via the radio access network 402. In particular, PDSN 504A still services IP/PPP protocol layer, including an IP/PPP transmit buffer function. Further, a C-RLP layer functions continue to be serviced by BSC 506A of system A even after handover of the wireless link functions (via BTS 508B) of system B. Thus, the BSC 506A of system A continues to service the C-RLP transmit buffer after handover to system B. Appropriate packet data encapsulation may be required for routing of packet data between the BSC 506A of system A and the BTS 508B of system B. In the embodiment of FIG. 6, call control functions may be provided either by system A (as call control functions 556) or by system B (as call control functions 556) after handover has occurred.

Figure 7:
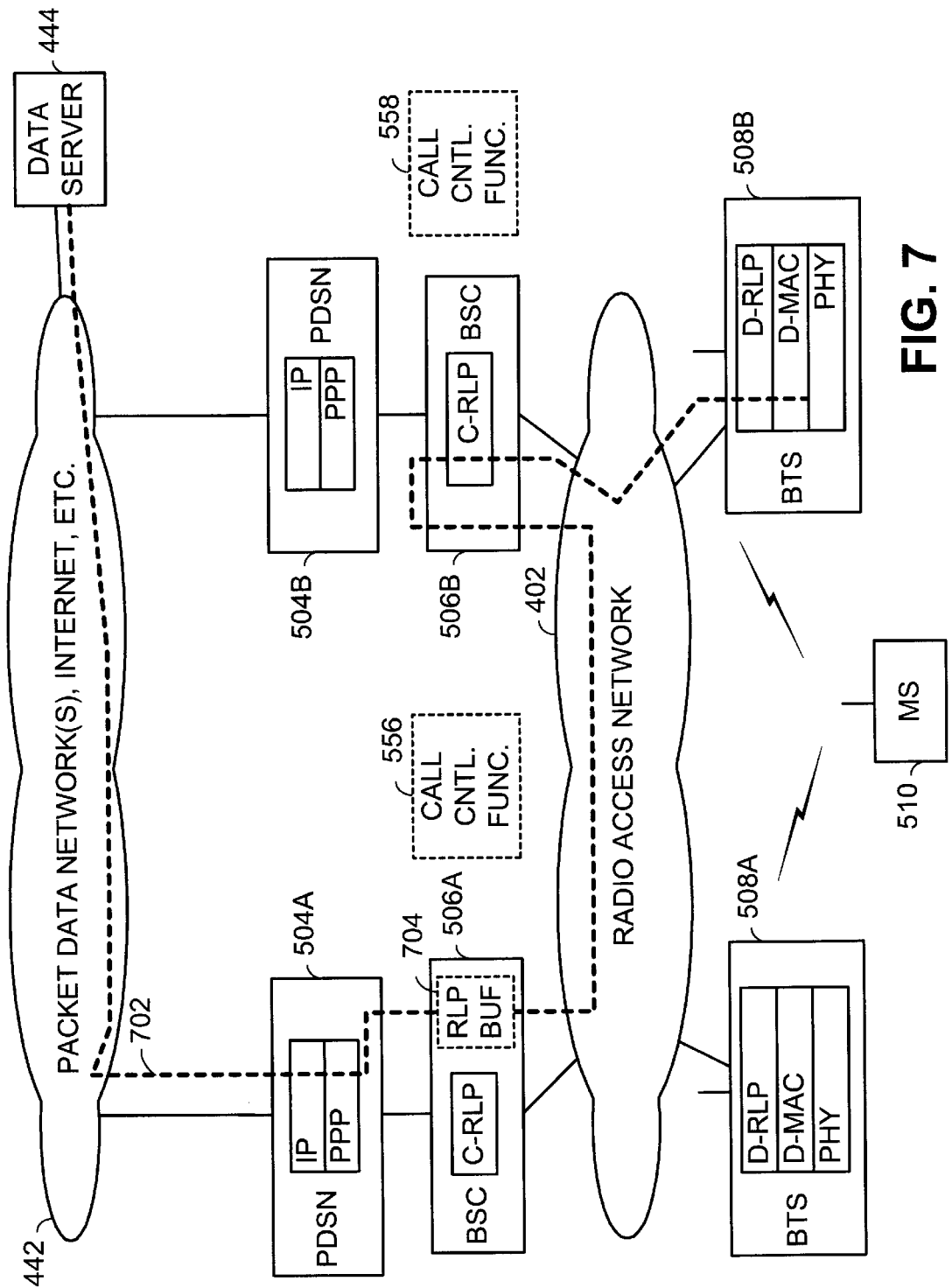
FIG. 7 is a system diagram illustrating the cellular wireless networks of FIG. 2 according to a third operation of the present invention.

FIG. 7 is a system diagram illustrating first and second cellular wireless networks that operate according to a third operation of the present invention. As is shown in FIG. 7, a data path 702 serviced after handover from system A to system B includes components that span both BSC 506A of system A and BSC 506B of system B. Further, the data path 702 spans PDSN 504A of system A but does not span PDSN 504B of system B.

As is illustrated, the data path 702 spans RLP buffer 704 of BSC 706A. Thus, after handover, system A provides both IP/PPP data buffering functions and RLP buffering functions even though system A does not provide other RLP functions, with these functions having been handed over to system B. Further, IP/PPP layer functions are anchored in system A before, during, and after handover. In the embodiment of FIG. 7, either system A or system B may provide layer 2/3 call control functions.

Figure 8:
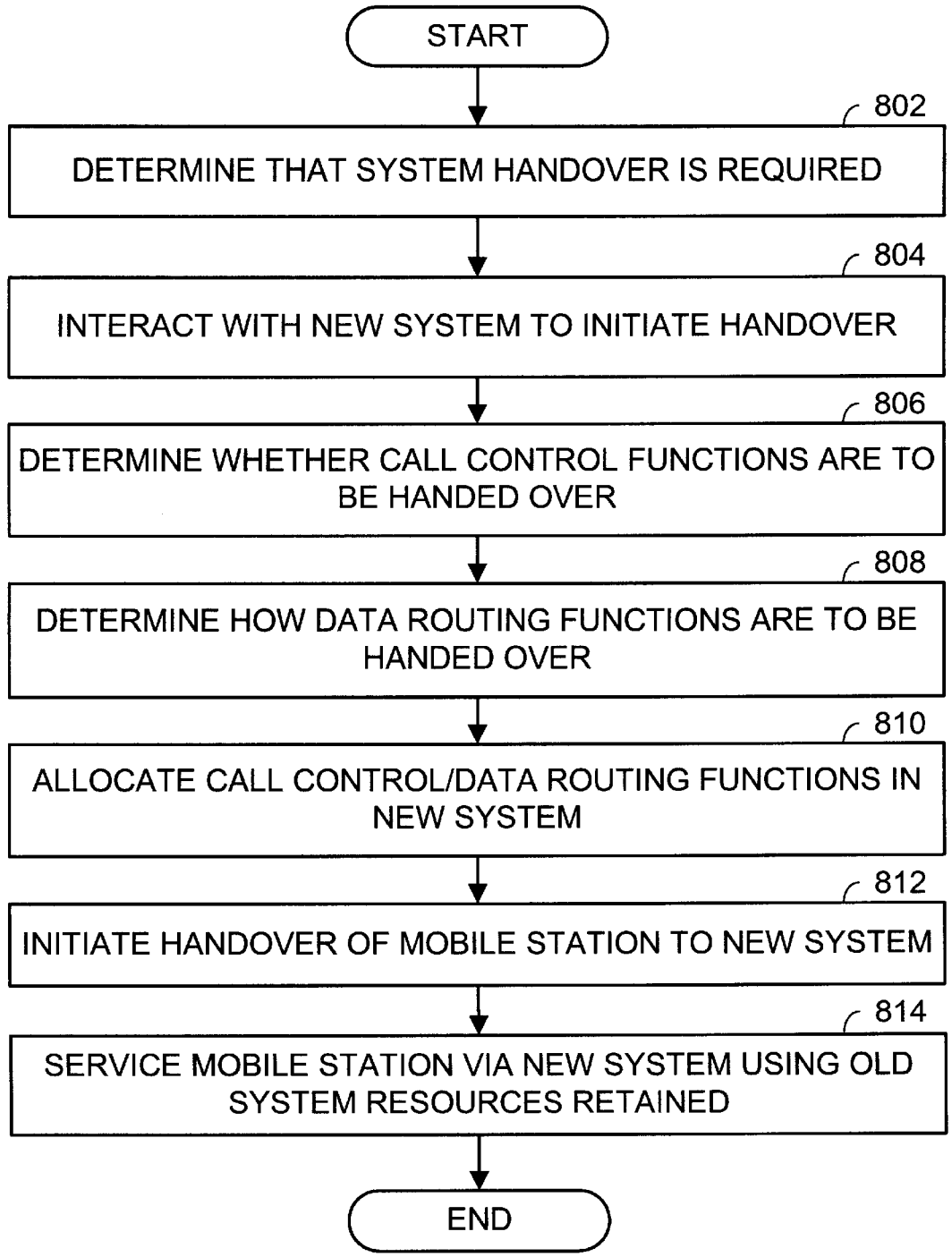
FIG. 8 is a logic diagram illustrating operation according to the present invention.

FIG. 8 is a logic diagram illustrating operation according to the present invention. Operation commences when currently serving system A determines that a handover to system B is required (step 802). As was previously described, this determination will be made based upon an indication from a serviced mobile station that system B base stations would provide wireless link service that is superior to that of system A. In such case, system A and system B interact to initiate the handover (step 804).

With the handover initiated, system A and/or system B will determine whether call control functions are to be handed over from system A to system B (step 806). Further, system A and/or system B will determine how data routing functions are to handed over from system A to system B (step 808). Based upon these determinations, system B allocates call control and/or data routing functions to service the data communication (step 810). Such allocation will include at least the allocation of a new serving BTS of system B. Then, the mobile station's data communication will be handed over from system A to system B (step 812). Of course, according to the present invention, a portion of the servicing of the data communication is retained by system A. With the handover completed, the data communication will be serviced jointly by the resources of system A and the resources of system B (step 814). From step 814, the data communication will continue be serviced in this manner until terminated or altered.

Figure 9:
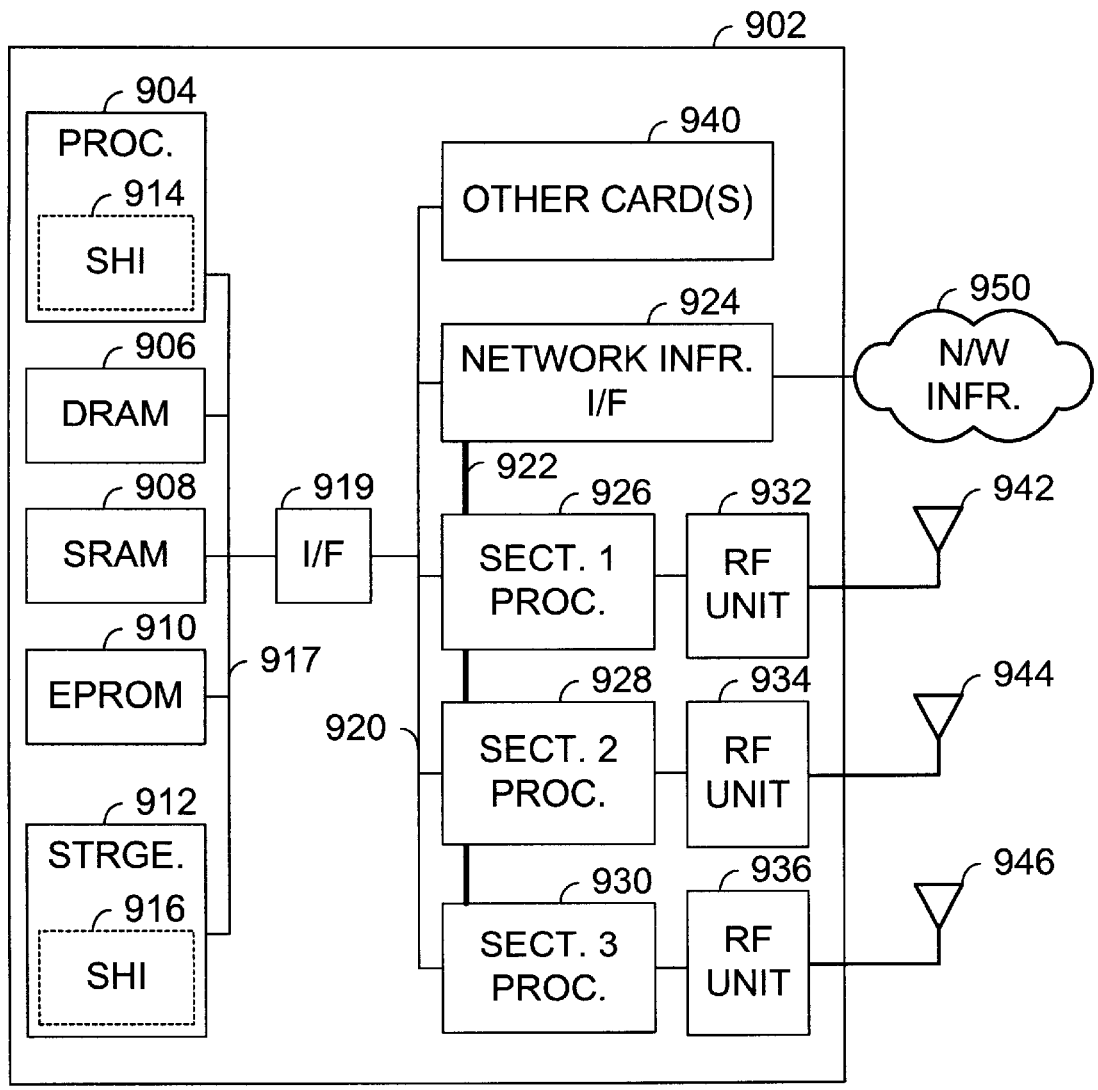
FIG. 9 is a block diagram illustrating a base station constructed according to the present invention.

FIG. 9 is a block diagram illustrating a base station/BTS 902 constructed according to the present invention. The BTS 902 supports an operating protocol that is compatible with the teachings of the present invention, with our without modification thereto. The BTS 902 supports protocol layer operations such as those described with reference to FIGS. 1–8.

The BTS 902 includes a processor 904, dynamic RAM 906, static RAM 908, Flash memory, EPROM 910 and at least one data storage device 912, such as a hard drive, optical drive, tape drive, etc. These components (which may be contained on a peripheral processing card or module) intercouple via a local bus 917 and couple to a peripheral bus 920 (which may be a back plane) via an interface 918. Various peripheral cards couple to the peripheral bus 920. These peripheral cards include a network infrastructure interface card 924, which couples the BTS 902 to the wireless network infrastructure 950.

Digital processing cards 926, 928, and 930 couple to Radio Frequency (RF) units 932, 934, and 936, respectively. Each of these digital processing cards 926, 928, and 930 performs digital processing for a respective sector, e.g., sector 1, sector 2, or sector 3, serviced by the BTS 902. Thus, each of the digital processing cards 926, 928, and 930 will perform some or all of processing operations described with reference to FIGS. 6 and 7. The RF units 932, 934, and 936 couple to antennas 942, 944, and 946, respectively, and support wireless communication between the BTS 902 and mobile stations (the structure of which is shown in FIG. 9). The BTS 902 may include other cards 940 as well.

System Handover Instructions (SHI) 916 are stored in storage 912. The SHI 916 are downloaded to the processor 904 and/or the DRAM 906 as SHI 914 for execution by the processor 904. While the SHI 916 are shown to reside within storage 912 contained in BTS 902, the SHI 916 may be loaded onto portable media such as magnetic media, optical media, or electronic media. Further, the SHI 916 may be electronically transmitted from one computer to another across a data communication path. These embodiments of the SHI are all within the spirit and scope of the present invention.

Upon execution of the SHI 914, the BTS 902 performs operations according to the present invention previously described herein with reference to the base stations/BTSs of FIGS. 1–8. The SHI 916 may also be partially executed by the digital processing cards 926, 928, and 930 and/or other components of the BTS 902. Further, the structure of the BTS 902 illustrated is only one of many varied BTS structures that could be operated according to the teachings of the present invention.

Figure 10:
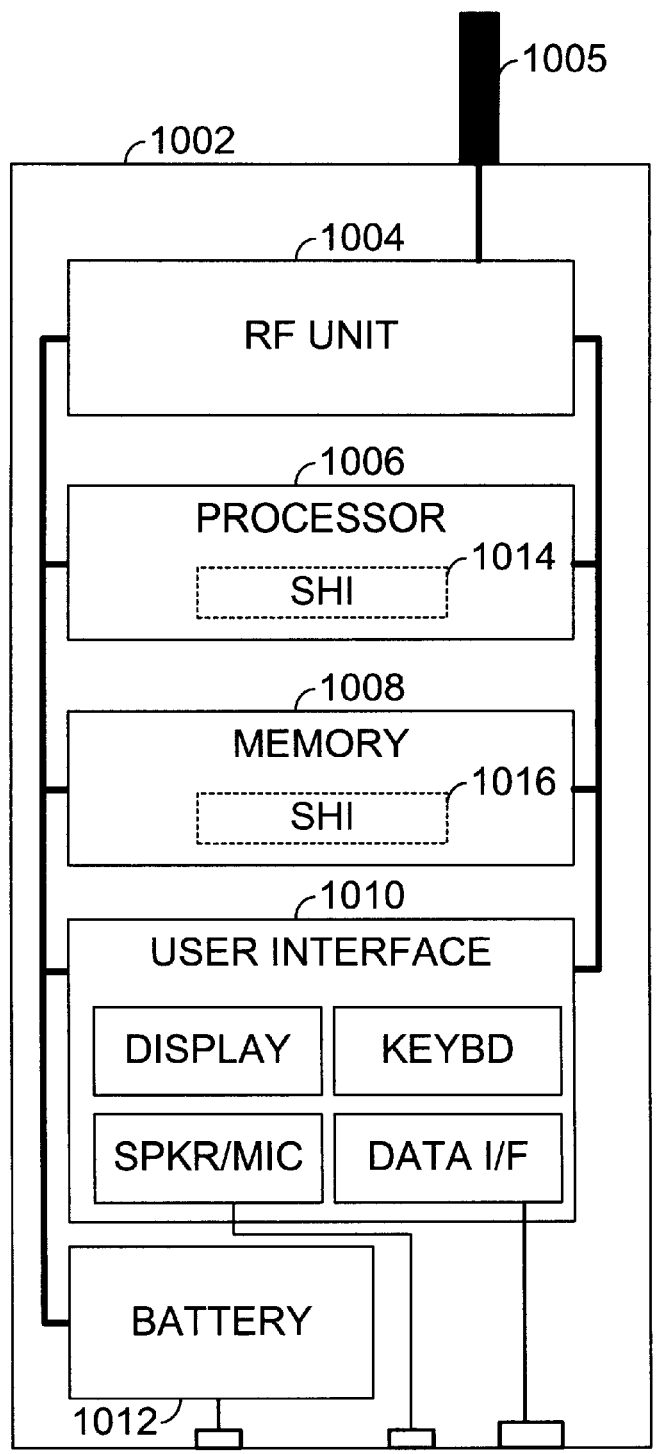
FIG. 10 is a block diagram illustrating a mobile station constructed according to the present invention.

FIG. 10 is a block diagram illustrating a mobile station 1002 constructed according to the present invention that performs the operations previously described herein. The mobile station 1002 supports standardized operations that are compatible with the teachings of the present invention, with or without modification. However, in other embodiments, the mobile station 1002 supports other operating standards.

The mobile station 1002 includes an RF unit 1004, a processor 1006, and a memory 1008. The RF unit 1004 couples to an antenna 1005 that may be located internal or external to the case of the mobile station 1002. The processor 1006 may be an Application Specific Integrated Circuit (ASIC) or another type of processor that is capable of operating the mobile station 1002 according to the present invention. The memory 1008 includes both static and dynamic components, e.g., DRAM, SRAM, ROM, EEPROM, etc. In some embodiments, the memory 1008 may be partially or fully contained upon an ASIC that also includes the processor 1006. A user interface 1010 includes a display, a keyboard, a speaker, a microphone, and a data interface, and may include other user interface components. The RF unit 1004, the processor 1006, the memory 1008, and the user interface 1010 couple via one or more communication buses/links. A battery 1012 also couples to and powers the RF unit 1004, the processor 1006, the memory 1008, and the user interface 1010.

System Handover Instructions (SHI) 1016 are stored in memory 1008. The SHI 1016 are downloaded to the processor 1006 as SHI 1014 for execution by the processor 1006. The SHI 1016 may also be partially executed by the RF unit 1004 in some embodiments. The SHI 1016 may be programmed into the mobile station 1002 at the time of manufacture, during a service provisioning operation, such as an over-the-air service provisioning operation, or during a parameter updating operation. Upon their execution, the SHI 1014 cause the mobile station 1002 to perform operations according to the present invention previously described with reference to the mobile stations of FIGS. 1–8.

The structure of the mobile station 1002 illustrated is only an example of one mobile station structure. Many other varied mobile station structures could be operated according to the teachings of the present invention. Upon execution of the SHI 1014, the mobile station 1002 performs operations according to the present invention previously described herein in servicing a VOIP telephony call. Further, the present invention may be implemented without modification of the mobile station.

Figure 11:
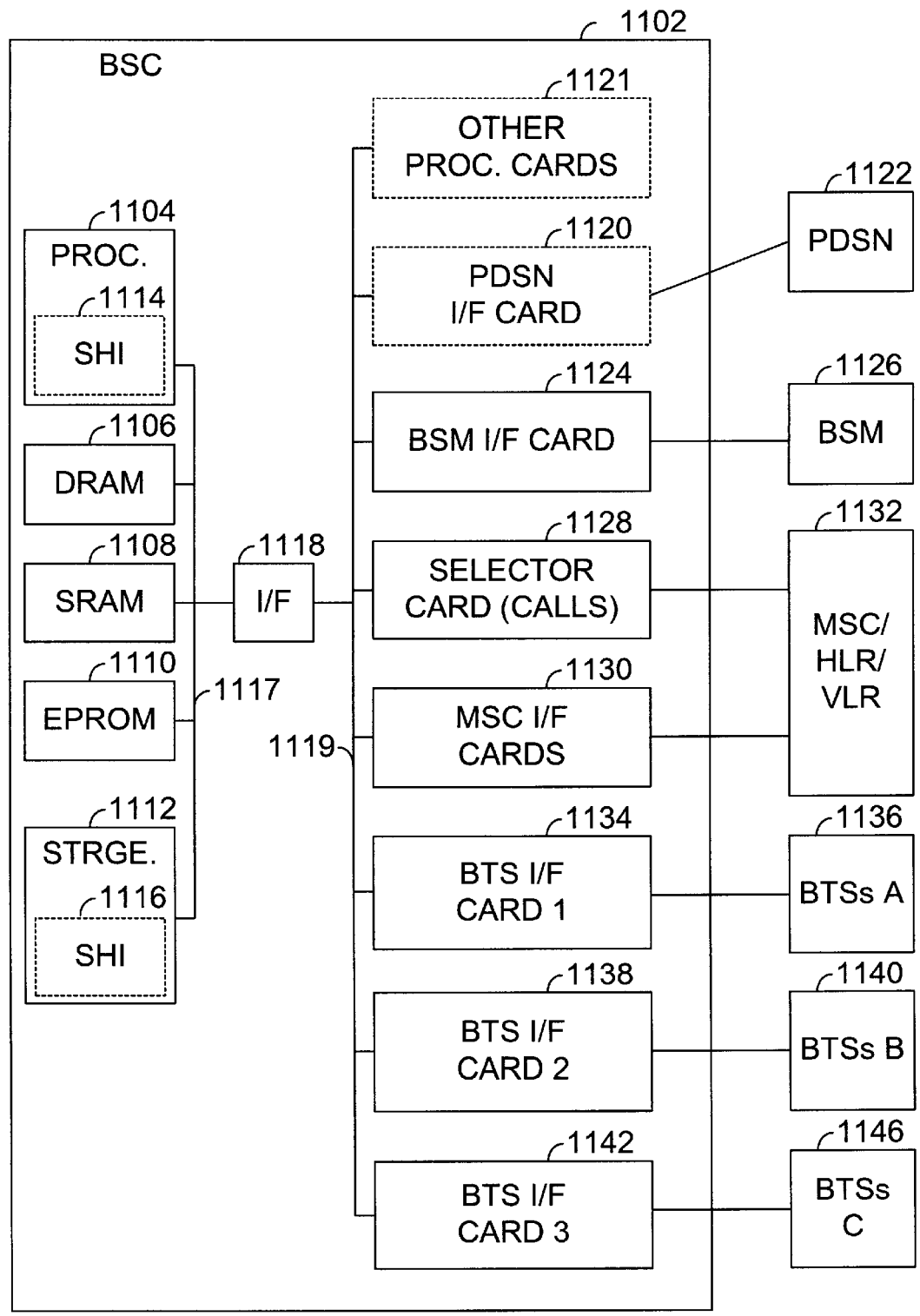
FIG. 11 is a block diagram illustrating a Base Station Controller (BSC) constructed according to the present invention.

FIG. 11 is a block diagram illustrating a Base Station Controller (BSC) 1102 constructed according to the present invention. The structure and operation of BSCs is generally known. The BSC 1102 services both circuit switched and packet switched operations. In some cases, the BSC 1102 is called upon to convert data between circuit switched and data switched formats, depending upon the types of equipment coupled to the BSC 1102. The components illustrated in FIG. 11, their function, and the interconnectivity may vary without departing from the teachings of the present invention.

The BSC 1102 includes a processor 1104, dynamic RAM 1106, static RAM 1108, EPROM 1110 and at least one data storage device 1112, such as a hard drive, optical drive, tape drive, etc. These components intercouple via a local bus 1117 and couple to a peripheral bus 1119 via an interface 1118. Various peripheral cards couple to the peripheral bus 1119. These peripheral cards include an IP network interface card 1120, a base station manager card 1124, at least one selector card 1128, a MSC interface card 1130, and a plurality of BTS interface cards 1134, 1138 and 1142.

The PDSN interface card 1120 couples the BSC 1102 to PDSN 1122. The base station manager interface card 1124 couples the BSC 1102 to a Base Station Manager 1126. The selector card 1128 and MSC interface card 1130 couple the BSC 1102 to the MSC/HLR/VLR 1132. the BTS interface cards 1134, 1138, and 1142 couple the BSC 1102 to base stations served by Base station Transceiver Subsystems (BTSs) 1136, 1140, and 1146, respectively. Note that each of the BTS interface cards 1134, 1138, and 1142 will typically couple to the respective BTSs 1136, 1140, and 1146 via a radio access network as was shown in FIGS. 4–8. Further, these BTS interface cases 1134, 1138, and 1142 may also be referred to as base station interface cards/base station interfaces. The BSC 1102 may also include other processing cards 1121 that perform additional/other processing functions.

In another embodiment of the present invention, a packet control function (PCF) 1123 is implemented separately from the BSC 1102. In such case, the BSC 1102 couples to the PCF 1123 via a PCF I/F card 1121. However, some of the PCF operations may be performed by a PDSN described with reference to FIG. 12

System Handover Instructions (SHI), along with the BSC 1102 hardware, enable the BSC 1102 to perform the operations of the present invention. The SHI 1116 are loaded into the storage unit 1112 and, upon their execution, some or all of the SHI 1114 are loaded into the processor 1104 for execution. During this process, some of the SHI 1116 may be loaded into the DRAM 1106.

Figure 12:
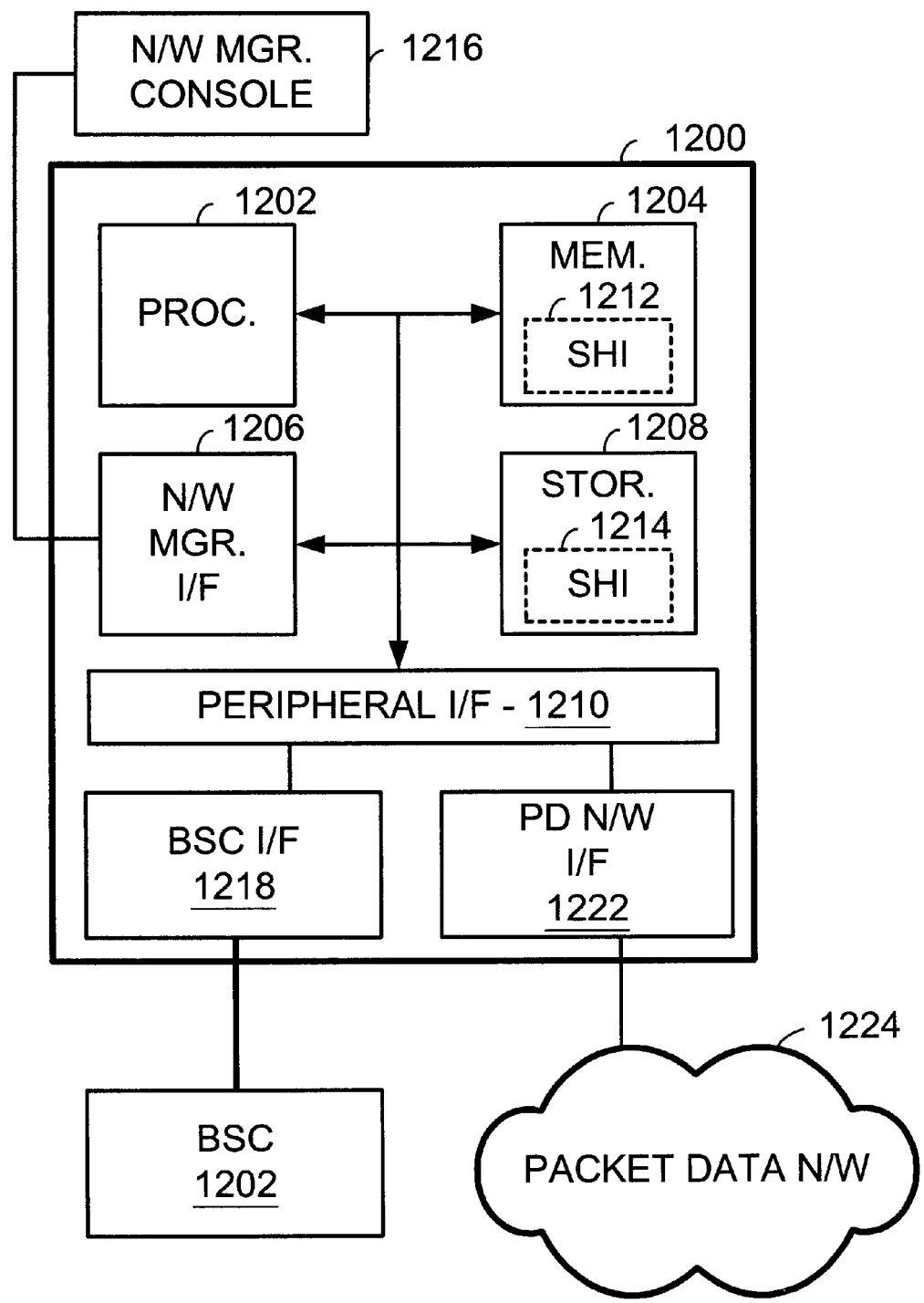
FIG. 12 is a block diagram illustrating a Packet Data Serving Node (PDSN) constructed according to the present invention.

FIG. 12 is a block diagram illustrating a Packet Data Serving Node (PDSN) 1200 constructed according to the present invention. The PDSN 1200 may be general-purpose computer that has been programmed and/or otherwise modified to perform the particular operations described herein. However, the PDSN 1200 may be specially constructed to perform the operations described herein. In particular, the PDSN 1200 may be the PDSN 114 that executes the PDSN operations described with reference to FIGS. 1–8.

Apart from the functions of the present invention, the PDSN 1200 performs functions that are basically the same as those performed by the Network Access Server (NAS) in data networks. A NAS is the entry point to the network and provides the end user with access to network services. In a CDMA 2000 system, the PDSN is the entry point to the public data network for MSs. The PDSN resides on the network edge and controls access to network services.

The PDSN 1200 includes a processor 1202, memory 1204, a network manager interface 1206, storage 1208, and a peripheral interface 1210, all of which couple via a processor bus. The processor 1202 may be a microprocessor or another type of processor that executes software instructions to accomplish programmed functions. The memory 1204 may include DRAM, SRAM, ROM, PROM, EPROM, EEPROM, or another type of memory in which digital information may be stored. The storage 1208 may be magnetic disk storage, magnetic tape storage, optical storage, or any other type of device, which is capable of storing digital instructions and data.

The network manager interface 1206 couples to a network manager console 1216, which allows a network manager to interface with the PDSN 1200 via a network manager console 1216. The network manager console 1216 may be a keypad/display or may be a more complex device, such as a personal computer, which allows the manager to interface with the PDSN 1200. However, the network manager may interface with the PDSN 1200 using other techniques as well, e.g., via a card coupled to the peripheral interface 1210.

The peripheral interface 1210 couples to a BSC interface 1218 and to an IP network interface 1222. The BSC interface 1218 couples the PDSN 1200 to the BSC 1102. The IP network interface 1222 couples the PDSN 1200 to an IP network 1224, e.g., a combination of the Internet, Intranets, LANs, WANs, etc. The IP network 1224 is shown generally as the Internet 114 of FIG. 1 and the Packet Data Networks 206 of FIG. 2. The IP network 1224 may be either of these networks or another packet switched network.

System Handover Instructions (SHI) 1212 are loaded into the storage 1208 of the PDSN 1200. Upon their execution, a portion of the SHI 1212 is downloaded into memory 1204 (as SHI 1214). The processor 1202 then executes the SHI 1214 to perform the operations described herein performed by the PDSN 1200. The programming and operation of digital computers is generally known to perform such steps. Thus, the manner in which the processor 1202 and the other components of the PDSN 1200 function to perform these operations are not further described herein.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for servicing a data communication for a mobile station before, during and after handover of the mobile station from a first wireless network to a second wireless network, the method comprising:

centralized link layer protocol functions of a base station controller of the first wireless network and distributed link layer protocol functions of a base station of the first wireless network servicing the mobile station before handover;

initiating a handover of the mobile station from the first wireless network to the second wireless network;

determining a first set of data communication functions to be serviced by the first wireless network after handover, including the centralized link layer protocol functions of the base station controller of the first wireless network;

determining a second set of data communication functions to be serviced by the second wireless network after handover, wherein the second set of data communication functions include at least wireless link functions and distributed link layer protocol functions of a base station of the second wireless network;

handing over the mobile station from the first wireless network to the second wireless network; and servicing the mobile station after handover using the first set of data communication functions provided by the first wireless network and the second set of data communication functions performed by the second wireless network.

2. The method of claim 1, wherein the second set of data communication functions comprises call control functions.

3. The method of claim 1, further comprising the base station controller of the first wireless network communicatively coupling to the base station of the second wireless network via a radio access network and servicing the data communication there through.

4. The method of claim 1, wherein the first set of data communication functions includes link layer data buffering functions.

5. The method of claim 1, wherein the second set of data communication functions includes link layer data buffering functions.

6. The method of claim 1, wherein the second set of data communication functions includes call control functions.

7. The method of claim 6, wherein the call control functions include layer 2/3 call control functions.

8. The method of claim 1, wherein servicing the mobile station after handover includes routing the data communication from a component of the first wireless network to a component of the second wireless network.

9. The method of claim 8, wherein the data communication is routed from the base station controller of the first wireless network to the base station of the second wireless network.

10. The method of claim 9, wherein at least a portion of a data routing path servicing the data communication remains after handover.

11. A base station controller of a first wireless network, the base station controller comprising:

a packet data serving node interface;

a base station interface that interfaces the base station controller to a plurality of base stations; and at least one digital processor coupled to the packet data serving node interface and the base station interface that executes software instructions causing the base station controller to:

service a data communication for a mobile station using centralized link layer protocol functions of the base station controller and distributed link layer protocol functions of a base station of the first wireless network coupled via the base station interface;

initiate a handover of the mobile station to a second wireless network;

determine a first set of data communication functions to be serviced by the first wireless network after handover, including the centralized link layer protocol functions of the base station controller;

determine a second set of data communication functions to be serviced by the second wireless network after handover, wherein the second set of data communication functions include at least wireless link functions and distributed link layer protocol functions of a base station of the second wireless network;

hand over the mobile station from the first wireless network to the second wireless network; and service the mobile station after handover using the first set of data communication functions provided by the first wireless network.

12. The base station controller of claim 11, wherein the second set of data communication functions comprises call control functions performed by a base station controller of the second wireless network.

13. The base station controller of claim 12, wherein the base station controller communicatively couples to the base station of the second wireless network via the base station interface and a radio access network and services the data communication there through.

14. The base station controller of claim 11, wherein the first set of data communication functions includes link layer data buffering functions performed by the base station controller.

15. The base station controller of claim 11, wherein the second set of data communication functions includes link layer data buffering functions performed by a base station controller of the second wireless network.

16. The base station controller of claim 11, wherein the second set of data communication functions includes call control functions performed by a base station controller of the second wireless network.

17. The base station controller of claim 16, wherein the call control functions include layer 2/3 call control functions.

18. The base station controller of claim 11, wherein when the mobile station is serviced after handover, the base station controller routes the data communication to a base station controller of the second wireless network.

19. The base station controller of claim 18, wherein when the mobile station is serviced after handover, the base station controller provides link layer data buffering functions.

20. The base station controller of claim 11, wherein at least a portion of a data routing path servicing the data communication remains after handover.

21. A plurality of software instructions stored on a media for execution by a base station controller, the plurality of software instructions comprising:

a set of instructions executed by the base station controller that cause the base station controller to service a data communication for a mobile station using centralized link layer protocol functions of the base station controller and distributed link layer protocol functions of a base station of the first wireless network coupled via the base station interface;

a set of instructions executed by the base station controller that cause the base station controller to initiate a handover of the mobile station to a second wireless network;

a set of instructions executed by the base station controller that cause the base station controller to determine a first set of data communication functions to be serviced by the first wireless network after handover, including the centralized link layer protocol functions of the base station controller;

a set of instructions executed by the base station controller that cause the base station controller to determine a second set of data communication functions to be serviced by the second wireless network after handover, wherein the second set of data communication functions include at least wireless link functions and distributed link layer protocol functions of a base station of the second wireless network;

a set of instructions executed by the base station controller that cause the base station controller to hand over the mobile station from the first wireless network to the second wireless network; and a set of instructions executed by the base station controller that cause the base station controller to service the mobile station after handover using the first set of data communication functions provided by the first wireless network.

* * * * *